US007212305B2

(12) United States Patent
Noda

(10) Patent No.: US 7,212,305 B2
(45) Date of Patent: May 1, 2007

(54) PRINTING METHOD HAVING AUTO RETREAT FUNCTION OF PRINT DATA AND MEDIUM FOR STORING PROGRAM FOR EXECUTING THE PRINTING METHOD

(75) Inventor: Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/973,267

(22) Filed: Oct. 27, 2004

(65) Prior Publication Data

US 2005/0088688 A1    Apr. 28, 2005

Related U.S. Application Data

(62) Division of application No. 09/579,503, filed on May 3, 2000, now Pat. No. 6,897,972.

(30) Foreign Application Priority Data

Jun. 2, 1999    (JP)    ................... 11-154538

(51) Int. Cl.
*H04N 1/40*    (2006.01)
(52) U.S. Cl. ..................... 358/1.15; 358/468
(58) Field of Classification Search ...... 358/1.14–1.16, 358/1.9, 2.1, 435–441, 468
See application file for complete search history.

(56) References Cited

U.S. PATENT DOCUMENTS

| 5,594,653 | A | 1/1997 | Akiyama et al. | ........... 700/117 |
|---|---|---|---|---|
| 5,619,623 | A | 4/1997 | Takayanagi et al. | ....... 358/1.15 |
| 6,144,457 | A | 11/2000 | Higuchi | ...................... 358/1.14 |
| 6,351,315 | B2 | 2/2002 | Kusumoto | .................. 358/1.14 |
| 6,639,687 | B1 | 10/2003 | Neilsen | ...................... 358/1.14 |

FOREIGN PATENT DOCUMENTS

JP    07-223341    8/1995

*Primary Examiner*—Thomas D. Lee
*Assistant Examiner*—Stephen Brinich
(74) *Attorney, Agent, or Firm*—Fitzpatrick, Cella, Harper & Scinto

(57)    ABSTRACT

An object of the invention is to provide a printing method whereby a function for retreating print data in the case where the print data cannot be printed is provided, and the printing of other print data is preferentially performed or a printing is enabled to be executed when an apparatus enters a printable status of the print data, thereby improving a print working efficiency. To accomplish this object, there is provided a printing method of using a host which can set an auto retreat of print data and a print output apparatus which is connected so that it can bidirectionally communicate with the host and is equipped with a memory device which can perform a retreat processing of the data in response to a request from the host, wherein the host sends the print data to the print output apparatus, the print output apparatus receives the print data sent from the host and checks whether the data can be normally printed or not on the basis of print attributes of the received print data and a status of the print output apparatus, when it is decided that the data can be normally printed, the printing is executed, and when it is decided that the data cannot be normally printed, the print data is retreated to the memory device in accordance with the setting of the auto retreat, thereby enabling the printing of other print data to be executed.

14 Claims, 15 Drawing Sheets

FIG. 10

PRINT: ● SINGLE-SIDED  ○ DOUBLE-SIDED

STAPLING: ● YES  ○ NO

PAPER SUPPLY: ○ UPPER CASSETTE  ● LOWER CASSETTE

EJECTION PORT: ● AUTO  ○ BIN-1  ○ BIN-2  ○ BIN-3

[CHANGE]

| JOB | OWNER | STATUS | SIZE | ATTRIBUTES |
|---|---|---|---|---|
| SAMPLE-C | B | RETREATED | XXKB | A3/SINGLE-SIDED/STAPLING/... |

FIG. 11A

JOB EXECUTION MANAGEMENT TABLE A

| NO. | ID | JOB | OWNER | PRINT DATA | JOB ATTRIBUTE | STATUS | .. |
|---|---|---|---|---|---|---|---|
| 1 | ID=981010-10 | TEST-1 | A | ¥FILE-A1 | A4/DOUBLE-SIDED/NO STAPLING/... | PRINTING | .. |
| 2 | ID=981010-20 | SAMPLE-B | B | ¥FILE-B1 | B5/SINGLE-SIDED/NO STAPLING/... | WAITING | .. |
| 3 | ID=981010-30 | TEST-2 | A | ¥FILE-A2 | A4/SINGLE-SIDED/NO STAPLING/... | WAITING | .. |
| 4 | ID=981010-40 | SAMPLE-C | B | ¥FILE-B2 | A3/SINGLE-SIDED/STAPLING/... | WAITING | .. |
| | | | | | | | |

FIG. 11B

JOB EXECUTION MANAGEMENT TABLE B

| NO. | ID | JOB | OWNER | PRINT DATA | JOB ATTRIBUTE | STATUS | .. |
|---|---|---|---|---|---|---|---|
| 1 | ID=981010-20 | SAMPLE-B | B | ¥FILE-B1 | B5/SINGLE-SIDED/NO STAPLING/... | WAITING | .. |
| 2 | ID=981010-30 | TEST-2 | A | ¥FILE-A2 | A4/SINGLE-SIDED/NO STAPLING/... | WAITING | .. |
| 3 | ID=981010-40 | SAMPLE-C | B | ¥FILE-B2 | A3/SINGLE-SIDED/STAPLING/... | WAITING | .. |
| | | | | | | | |

FIG. 11C

JOB EXECUTION MANAGEMENT TABLE C

| NO. | ID | JOB | OWNER | PRINT DATA | JOB ATTRIBUTE | STATUS | .. |
|---|---|---|---|---|---|---|---|
| 1 | ID=981010-30 | TEST-2 | A | ¥FILE-A2 | A4/SINGLE-SIDED/NO STAPLING/... | PRINTING | .. |
| 2 | ID=981010-40 | SAMPLE-C | B | ¥FILE-B2 | A3/SINGLE-SIDED/STAPLING/... | WAITING | .. |
| | | | | | | | |

FIG. 11D

JOB EXECUTION MANAGEMENT TABLE D

| NO. | ID | JOB | OWNER | PRINT DATA | JOB ATTRIBUTE | STATUS | ... |
|---|---|---|---|---|---|---|---|
| 2 | ID=981010-40 | SAMPLE-C | B | ¥FILE-B2 | A3/SINGLE-SIDED/STAPLING/... | WAITING | |
| | | | | | | | |
| | | | | | | | |
| | | | | | | | |
| | | | | | | | |

FIG. 11E

JOB EXECUTION MANAGEMENT TABLE E

| NO. | ID | JOB | OWNER | PRINT DATA | JOB ATTRIBUTE | STATUS | ... |
|---|---|---|---|---|---|---|---|
| 1 | ID=981010-20 | SAMPLE-B | B | ¥FILE-B1 | B5/SINGLE-SIDED/NO STAPLING/... | PRINTING | |
| | | | | | | | |
| | | | | | | | |
| | | | | | | | |
| | | | | | | | |

FIG. 11F

JOB EXECUTION MANAGEMENT TABLE F

| NO. | ID | JOB | OWNER | PRINT DATA | JOB ATTRIBUTE | STATUS | ... |
|---|---|---|---|---|---|---|---|
| 1 | ID=981010-40 | SAMPLE-C | B | ¥FILE-B2 | A3/SINGLE-SIDED/STAPLING/... | PRINTING | |
| | | | | | | | |
| | | | | | | | |
| | | | | | | | |
| | | | | | | | |

FIG. 12A

JOB RETREAT MANAGEMENT TABLE A

| NO. | ID | JOB | OWNER | PRINT DATA | JOB ATTRIBUTE | STATUS | : | : |
|---|---|---|---|---|---|---|---|---|
| 1 | ID=981010-20 | SAMPLE-B | B | ¥FILE-B1 | B5/SINGLE-SIDED/NO STAPLING/.... | RETREATED | | |
| | | | | | | | | |
| | | | | | | | | |
| | | | | | | | | |
| | | | | | | | | |

FIG. 12B

JOB RETREAT MANAGEMENT TABLE B

| NO. | ID | JOB | OWNER | PRINT DATA | JOB ATTRIBUTE | STATUS | : | : |
|---|---|---|---|---|---|---|---|---|
| 1 | ID=981010-20 | SAMPLE-B | B | ¥FILE-B1 | B5/SINGLE-SIDED/NO STAPLING/.... | RETREATED | | |
| 2 | ID=981010-40 | SAMPLE-C | B | ¥FILE-B2 | A3/SINGLE-SIDED/STAPLING/.... | RETREATED | | |
| | | | | | | | | |
| | | | | | | | | |
| | | | | | | | | |

FIG. 12C

JOB RETREAT MANAGEMENT TABLE C

| NO. | ID | JOB | OWNER | PRINT DATA | JOB ATTRIBUTE | STATUS | : | : |
|---|---|---|---|---|---|---|---|---|
| 1 | ID=981010-40 | SAMPLE-C | B | ¥FILE-B2 | A3/SINGLE-SIDED/STAPLING/.... | RETREATED | | |
| | | | | | | | | |
| | | | | | | | | |
| | | | | | | | | |
| | | | | | | | | |

FIG. 13

AUTO RETREAT INFO TABLE

| ITEM | CONTENTS |
|---|---|
| NO PAPER | NO PAPER OF DESIGNATED SIZE |
| NO STAPLE | NO STAPLE FOR STAPLING |
| PORT-FULL | EJECTION PORT IS FULL OF PRINTED PAPERS; FURTHER EJECTION IS IMPOSSIBLE |
| PORT-PAPER | PRINTED PAPER(S) IS/ARE IN EJECTION PORT; FURTHER EJECTION WILL CAUSE MIXED PAPERS |
| TONER-LOW | TONER AMOUNT IS LOW; PRINT QUALITY WILL BE POOR |
| .. | .. |

PRINTING METHOD HAVING AUTO RETREAT FUNCTION OF PRINT DATA AND MEDIUM FOR STORING PROGRAM FOR EXECUTING THE PRINTING METHOD

This application is a division of application Ser. No. 09/579,503, filed May 30, 2000 now U.S. Pat. No. 6,879,972.

BACKGROUND OF THE INVENTION

1. Field of the Invention

The invention relates to a printing method having an auto retreat function of print data and a medium for storing a program for executing the printing method.

2. Related Background Art

Hitherto, in an information processing system, a mechanism in which when expendable supplies such as papers or the like are absent and an error occurs during the execution of print data, a processing is suspended while processing information including the print data is held and when the expendable supplies are supplemented, the processing can be soon resumed has been provided, thereby improving a working efficiency of the user.

For example, it is assumed that papers of the A4 size and A3 size have been set in a printer and print data in which the B5 size was designated as a paper size has been sent from a host (host computer). The printer receives the print data and, at a point when it is detected that the B5 size whose papers are not set has been designated, the printer enters an error status. According to the conventional technique, the printer does not enter a status where the print data is abandoned and new print data can be processed but suspends the processing while a processing status so far is held and at a point when it is recognized that the expendable supplies have been supplemented, the printer resumes the processing. The user, therefore, can immediately obtain an output by setting papers into the printer. That is, after an error was recognized, the user does not need to perform work for sending the print data again from the host and can efficiently take a proper countermeasure against the error due to the absence of the expendable supplies.

According to the conventional technique, however, since the whole print processing is suspended at a point when the error occurs, not only the processing of the print data in which the error occurred but also the processing of the print data which is waiting to subsequently print is suspended. There is, consequently, a drawback of deterioration in print working efficiency of the other user.

For example, it is assumed that papers of the A4 size and A3 size have been set in a printer in FIG. 5. Print data A in which the B5 size was designated as a paper size is sent from a host A in FIG. 5 and, thereafter, print data B in which the A4 size was designated as a paper size is sent from a host B. In this case, according to the conventional technique, the printer receives the print data A and at a point when it is detected that the B5 size whose papers are not set was designated, the printer enters the error status and suspends the processing. The processing of the print data B is also suspended at a point when the print data B has been sent to the printer. That is, in spite of the fact that the print data B can be printed without causing an error because the A4 size whose papers have been set in the printer is designated, the print data B is influenced by the print data A which was precedingly processed, so that the processing is suspended.

If the user of the host A or the printer administrator rapidly takes a countermeasure (the papers are supplemented, the print data is cancelled, or the like) against the print data A at this time point, after the processing of the print data A, the user of the host B can obtain an output of the print data B. However, if a timing for taking the countermeasure is delayed as in the case where the user of the host A is not aware of the occurrence of the error, the case where the papers of the B5 size cannot be soon supplemented, or the like, the working efficiency of the user of the host B remarkably deteriorates.

It is assumed that there is a situation where the printer in FIG. 5 is connected to the network and many users frequently use the printer. In this case, the output of a large amount of print data (many users) has to be waited upon occurrence of the error and a range where the working efficiency deteriorates is widened.

SUMMARY OF THE INVENTION

The invention is made in consideration of the above circumstances.

That is, it is an object of the invention to provide a printing method whereby by providing a function for retreating print data in the case where the print data cannot be printed, a printing of other print data is preferentially performed or when an apparatus enters a status where the print data can be printed, the printing is enabled to be executed, thereby improving a printing working efficiency.

To accomplish the above object, according to a preferred aspect of the invention, there is provided a printing method of using a host which can set an auto retreat of print data and a print output apparatus which is connected so that it can bidirectionally communicate with the host and is equipped with a memory device which can perform a retreat processing of the data in response to a request from the host, wherein the host sends the print data to the print output apparatus, the print output apparatus receives the print data sent from the host and discriminates whether the data can be normally printed or not on the basis of print attributes of the received print data and a status of the print output apparatus, when it is determined that the data can be normally printed, the printing is executed, and when it is determined that the data cannot be normally printed, the print data is retreated to the memory device in accordance with the setting of the auto retreat, thereby enabling the printing of other print data to be executed.

Another object of the invention is to provide a medium for recording modules for executing the above printing method.

The invention has the medium for recording modules by the above printing method.

The above and other objects and features of the present invention will become apparent from the following detailed description and the appended claims with reference to the accompanying drawings.

BRIEF DESCRIPTION OF THE DRAWINGS

FIG. 10 is a conceptual diagram for explaining the print method in the embodiment of the invention;

FIGS. 11A, 11B, 11C, 11D, 11E and 11F are conceptual diagrams for explaining the print method in the embodiment of the invention;

FIGS. 12A, 12B and 12C are conceptual diagrams for explaining the print method in the embodiment of the invention;

FIG. 13 is a conceptual diagram for explaining the print method in the embodiment of the invention;

DETAILED DESCRIPTION OF THE PREFERRED EMBODIMENTS

Embodiments of the invention will now be described with reference to the drawings.

(Embodiment 1)

The following description will be made on the assumption that the printer in FIG. 5 has a storage which can perform a retreat processing of print data in response to a request from a host (computer) as a prerequisite. A connecting style of the hosts and the printer is also similarly applied to a style in which the hosts and the printers are connected in a one-to-one connecting relational manner or a style in which the printer is connected to a print server as shown in FIG. 6. For example, it is assumed that only the papers of the A4 size and the A3 size have been set in the printer in FIG. 5 and the printer is in a status where there is no staple although the printer has a stapling function.

Figure 1:
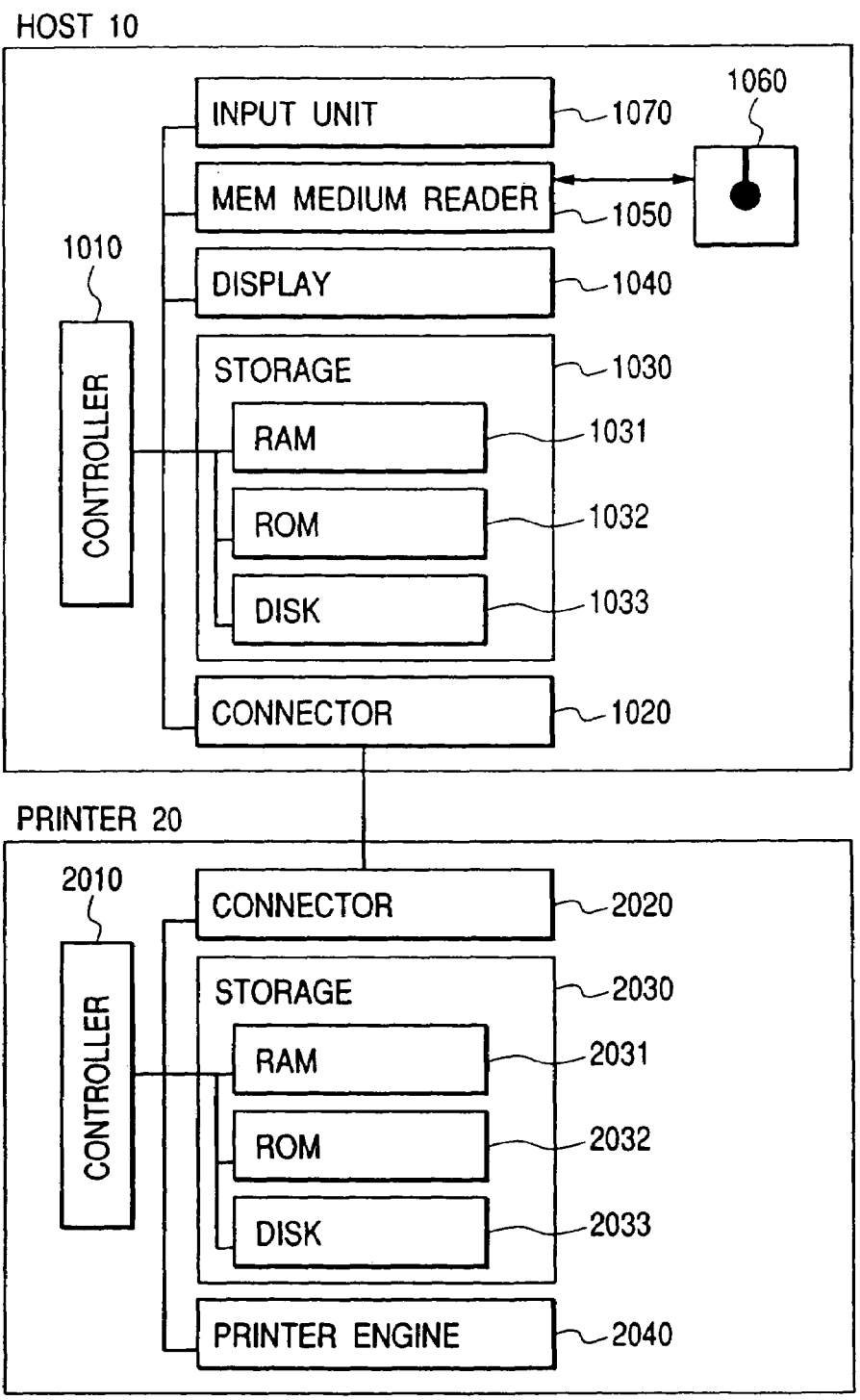
FIG. 1 is a block diagram showing a construction of an information processing system to which a print method of an embodiment of the invention is applied.

Modules which realize a main body of an apparatus have been installed in a disk 1033 in a storage 1030 of a host 10 in FIG. 1. It is assumed that when the host 10 is activated, the modules which realize the invention are read into an RAM 1031 in the storage 1030 in FIG. 1 and executed. The modules which execute the invention are program codes converted on the basis of flowcharts shown in FIGS. 14 to 18.

Figure 4:
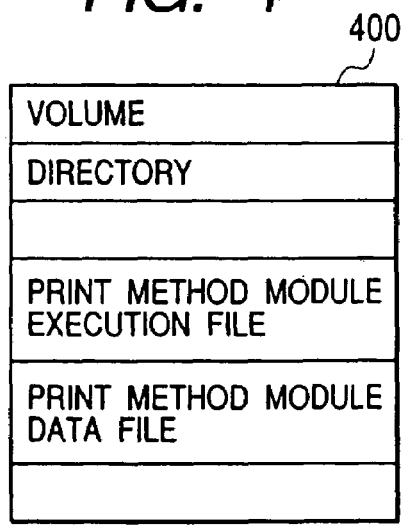
FIG. 4 is a constructional diagram of the medium on which the modules in the embodiment of the invention have been recorded.

The modules realizing the invention and the related data can be also loaded into the host 10 from a memory medium reader 1050 of the host 10 and executed. It is assumed that the modules realizing the invention and the related data have been recorded on a recording medium 20020 in FIG. 2 and have a recording construction as shown in FIG. 4. In this case, the modules realizing the invention and the related data recorded on the recording medium 20020 can be loaded into the host 10 via a memory medium reader 20010 in FIG. 2.

Figure 3:
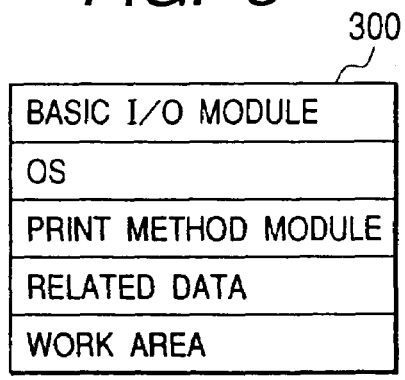
FIG. 3 is a diagram showing a memory map in the case where the modules in the embodiment of the invention operate.

When the recording medium 20020 is set into the memory medium reader 20010 of the host 10, the modules realizing the invention and the related data are read out of the recording medium 20020 under the control of the OS and a basic I/O program, is loaded into the RAM in the storage 1030 of the host 10, and can be operated. FIG. 3 shows a memory map in a state where the modules realizing the invention and the related data have been loaded into the RAM 1031 in the storage 1030 of the host 10 and can be operated.

Figure 2:
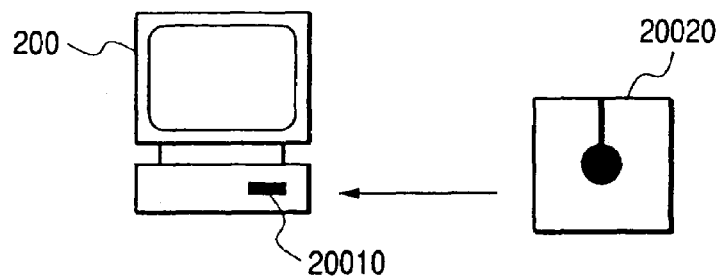
FIG. 2 is a diagram showing a state where modules are supplied to a host from a medium on which the modules in the embodiment of the invention have been recorded.

The modules realizing the invention and the related data recorded on the recording medium 20020 in FIG. 2 can be temporarily stored (installed) into the disk 1033 or the like in the storage 1030 of the host 10 and can be loaded into the RAM 1031 in the storage 1030 of the host 10 from the disk 1033 or the like in the storage 1030 of the host 10 each time the modules realizing the invention and the related data are made operative.

Figure 5:
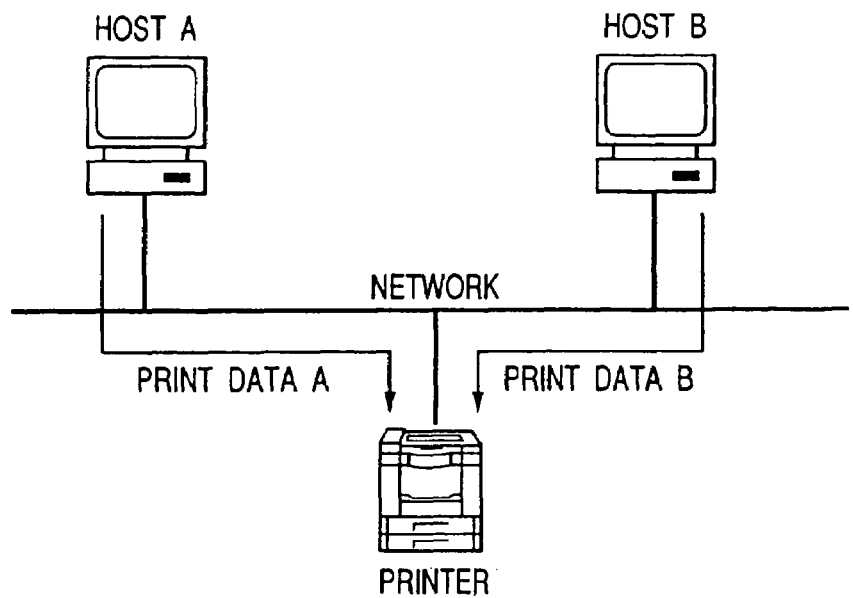
FIG. 5 is a conceptual diagram for explaining the print method in the embodiment of the invention.
Figure 6:
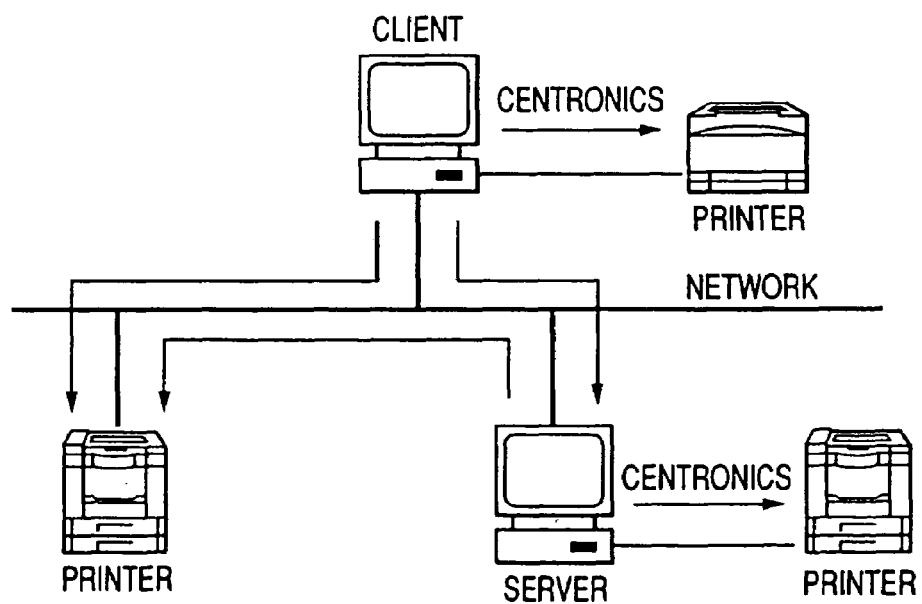
FIG. 6 is a conceptual diagram for explaining the print method in the embodiment of the invention.

Although the host which sends the print data in which an error occurs and the host which sends the print data in which no error occurs are different in FIG. 5, the invention can be also applied to a case where they are the same host.

The description of the invention is further made on the assumption of the following points as a prerequisite.

That is, an auto retreat information table showing an error which can automatically retreat as shown in FIG. 13 has been stored in a disk 2033 in a storage 2030 of the printer in FIG. 1. The auto retreat information table can be stored on the disk 1033 in the storage 1030 of the host 10 and can be downloaded into the printer when the host is activated.

The invention will now be described on the assumption of the above points.

Figure 7:
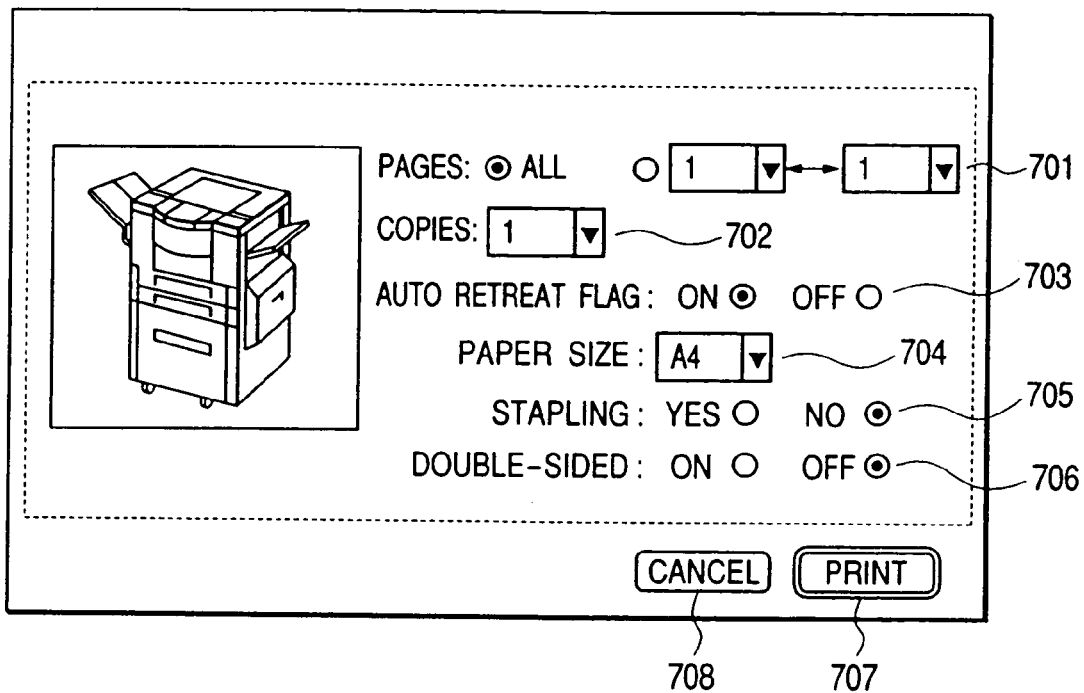
FIG. 7 is a conceptual diagram for explaining the print method in the embodiment of the invention.

First, a flow of processing of the host A in FIG. 5 will be described. First, the user designates a printing method in the host A in FIG. 5 and allows a display of the host A to display a print dialog (FIG. 7) of software (printer driver or the like) for making print data. In the example of FIG. 7, as attributes of the print data whose processing is started from now on, an all-page printing mode is designated by clicking a button 701 and the number of copies (namely, "1") is designated by clicking a button 702. An auto retreat flag is "set" by clicking a button 703. A paper size is set to "A4" by clicking a button 704. A stapling is set to "NO" by clicking a button 705. A single-sided printing or the like is set by clicking a button (double-sided) 706 to "NO". The user selects a "print" button 707 in the print dialog, so that a controller 1010 of the host in FIG. 1 starts a print processing (step 1401) shown in FIG. 14.

Reference numeral 708 denotes a "cancel" button of the printing. As mentioned above, the user can set whether the auto retreat is permitted or not on a print job unit basis on the display of the host.

The controller 1010 receives a print request from application, forms print data "TEST-1", and temporarily stores it into the RAM 1031 in the storage 1030 of the host (step 1402). In the embodiment, it is assumed that the controller 1010 obtains the print data from the OS or application at this time point and temporarily stores it into the disk 1033 in the storage 1030 of the host 10. The print data can be successively obtained from the OS or application at a necessary time point.

The controller 1010 subsequently sets the auto retreat flag to the print data "TEST-1" stored in the RAM 1031 in the storage 1030 (step 1403).

Figure 9:
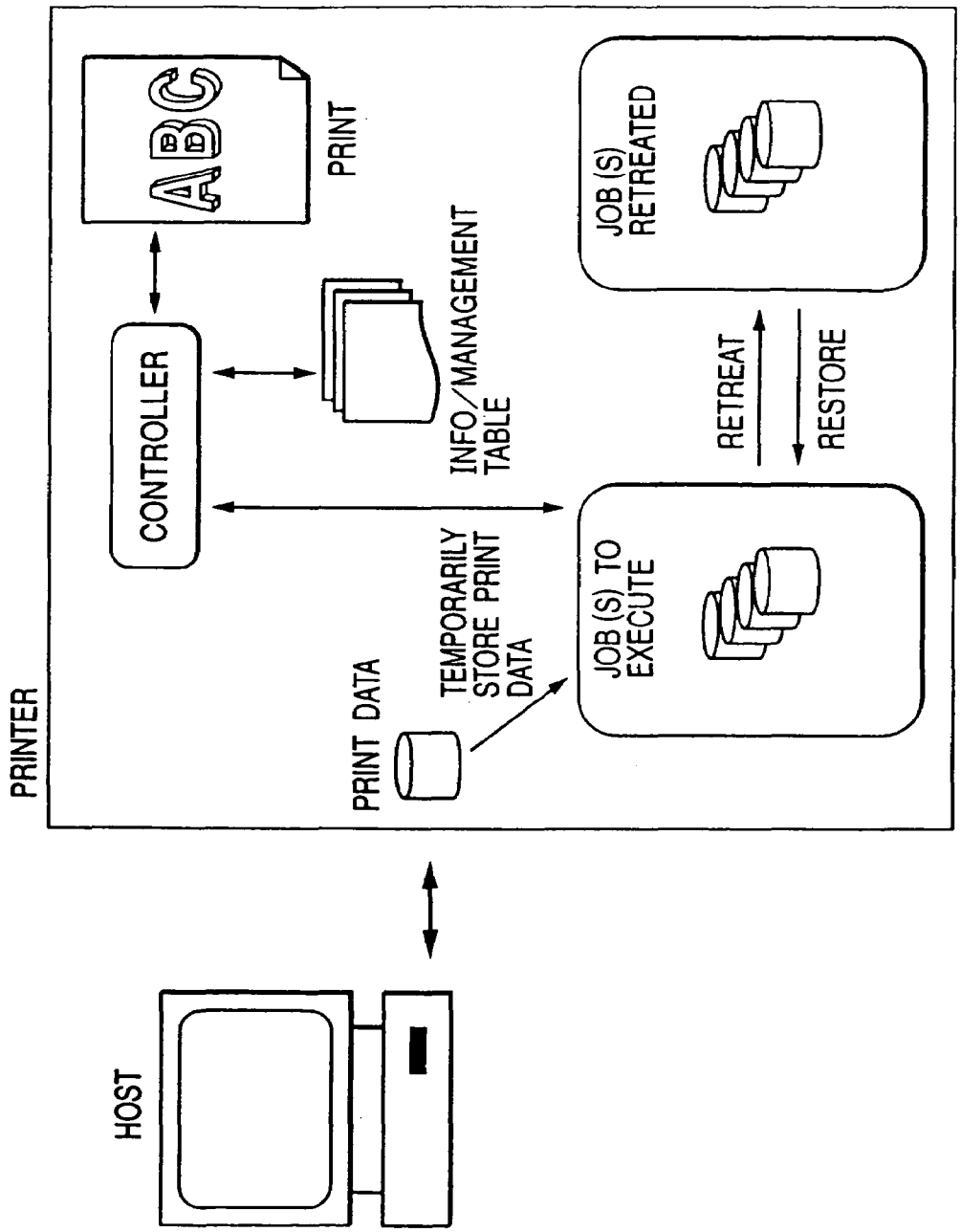
FIG. 9 is a conceptual diagram for explaining the print method in the embodiment of the invention.
Figure 14:
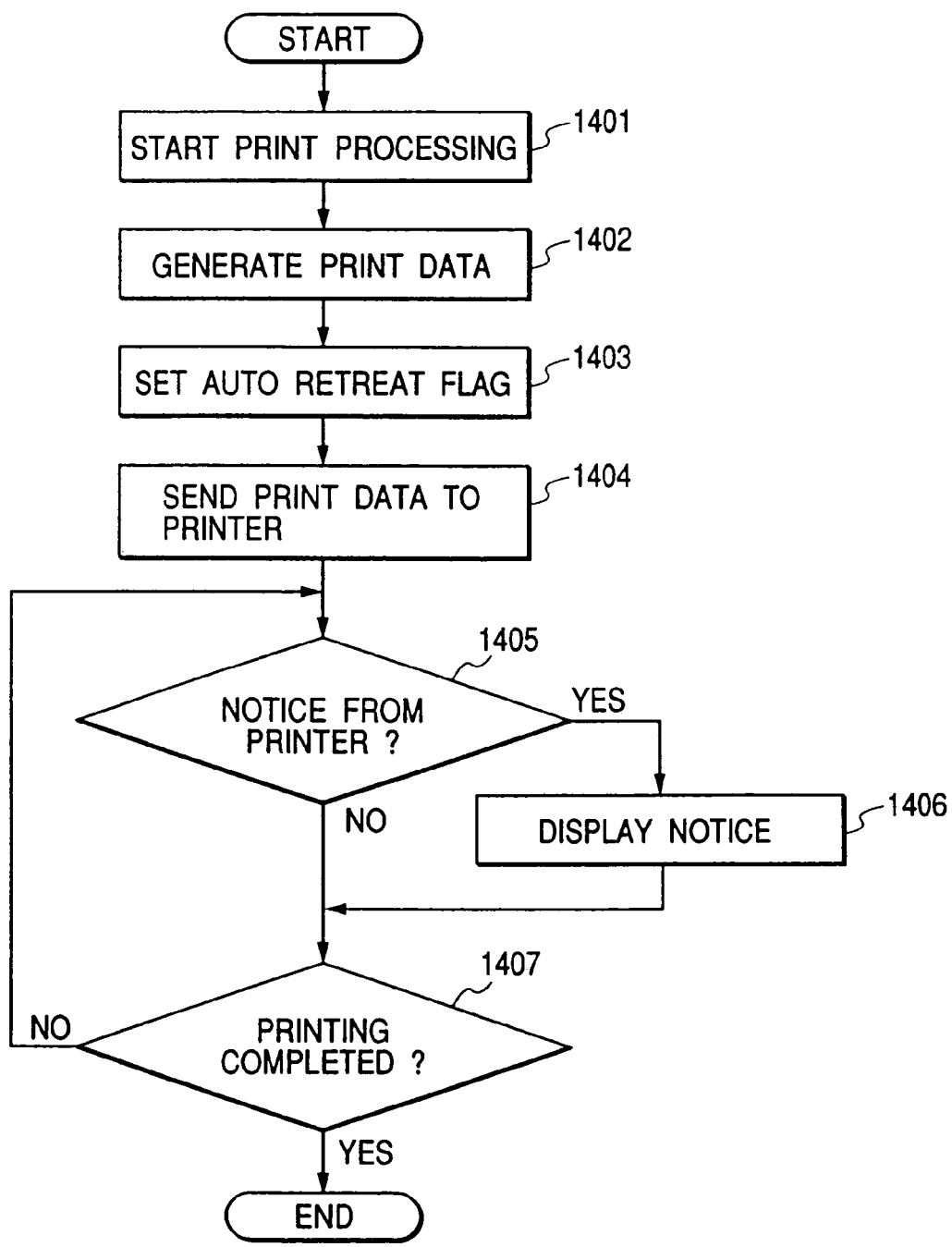
FIG. 14 is a flowchart showing a flow of a control in the invention.
Figure 15:
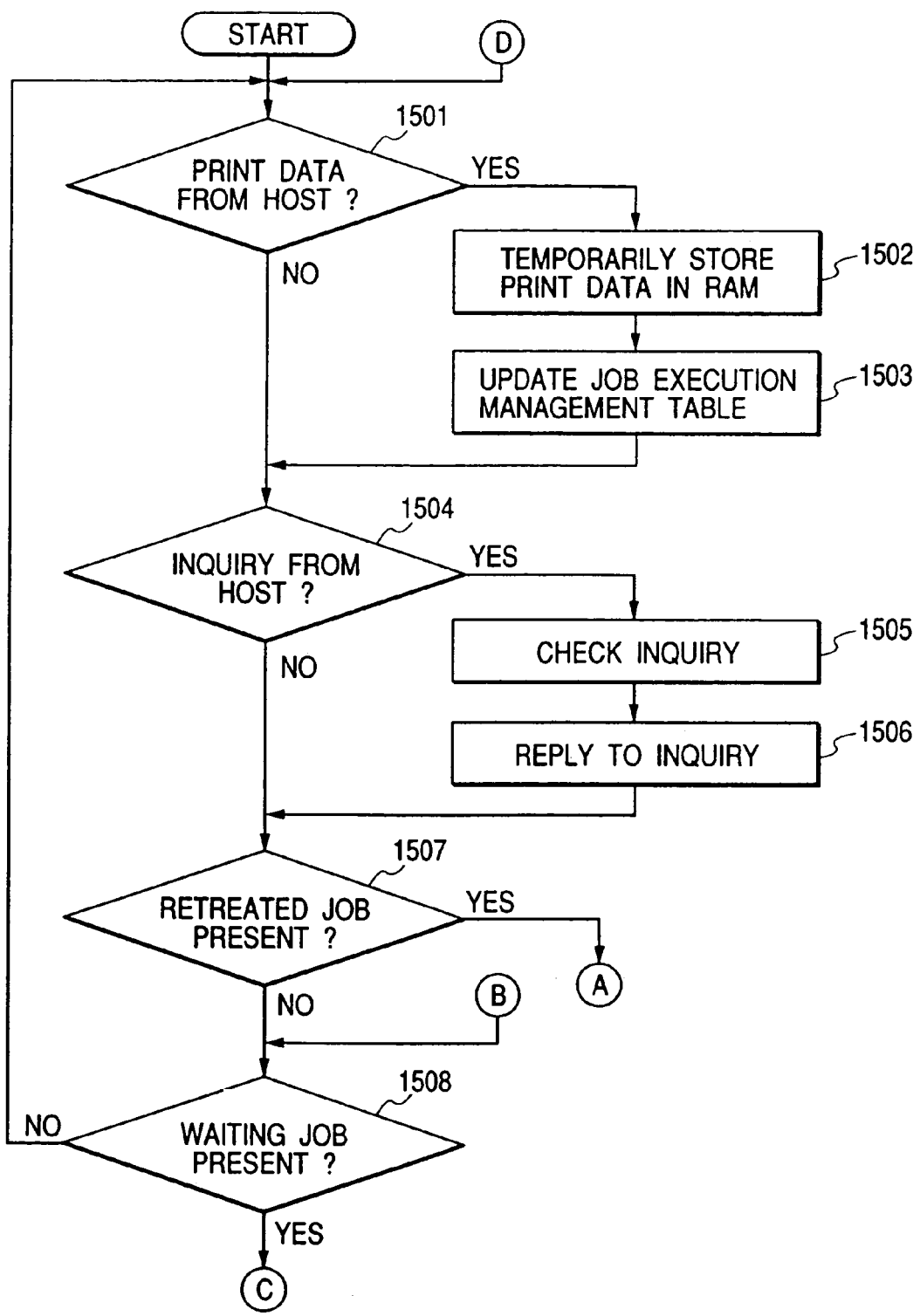
FIG. 15 is a flowchart showing a flow of the control in the invention.

The controller 1010 sends the print data "TEST-1" stored in the RAM 1031 in the storage 1030 to the printer as shown in FIG. 5 (step 1404). Actually, the controller 1010 transfers the print data "TEST-1" to a controller 2010 of the printer via a connector 1020 of the host 10 and a connector 2020 of a printer 20 in FIG. 1. At this time point, the print data "TEST-1" sent from the host A has been sent as shown in FIG. 9.

A flow of processing (refer to FIG. 15) in the printer in FIG. 5 will now be described.

The controller 2010 of the printer discriminates whether the print data has been received from the host or not (step 1501).

The controller 2010 of the printer subsequently determines that it received the print data from the host because the print data "TEST-1" has been received, and temporarily stores the print data "TEST-1" into an RAM 2031 in the storage 2030 of the printer 20 (step 1502).

The controller 2010 of the printer subsequently inputs (updates) information (item of No. 1 in FIG. 11A) of the print data "TEST-1" into job execution management tables (FIGS. 11A to 11F) which exist in the RAM 2031 in the storage 2030 of the printer and are used to manage the print processing (step 1503).

A flow (refer to FIG. 14) of the subsequent processing in the host A in FIG. 5 will be described.

The controller 1010 discriminates whether any notice has been received from the printer or not (step 1405). Since no notice is received from the printer at this time point, the controller 1010 determines that no notice is received.

The controller 1010 subsequently discriminates whether the processing for the sent print data "TEST-1" has been completed or not (step 1407). Specifically speaking, control data to obtain the status of the print data "TEST-1" sent from the controller 1010 is transferred to the controller 2010 of the printer via the connector 1020 of the host and the connector 2020 of the printer in FIG. 1.

A flow (refer to FIG. 15) of processing of the printer in FIG. 5 will now be described.

The controller 2010 of the printer discriminates whether an inquiry has been received or not (step 1504). In this case, since the control data to obtain the status of the print data "TEST-1" has been received from the host A, the controller determines that the inquiry has been received. The controller 2010 of the printer analyzes the received control data and checks the control contents (step 1505). In the embodiment, since the control data is the control data to obtain the status of the sent print data "TEST-1", the controller 2010 of the printer analyzes the job execution management data stored in the RAM 2031 in the storage 2030 of the printer as shown in FIGS. 11A to 11F. As a result of the analysis, the controller 2010 of the printer recognizes that the status of the relevant print data indicates that the data is being printed, and replies about the information to the controller 1010 via the connector 2020 of the printer and the connector 1020 of the host (step 1506).

A flow (refer to FIG. 14) of processing of the host A in FIG. 5 will now be described.

On the basis of the information replied in step 1407, the controller 1010 determines that the processing of the print data "TEST-1" is not completed. The processing routine is returned to step 1405.

A flow (refer to FIG. 15) of processing of the printer in FIG. 5 will now be described.

The controller 2010 of the printer checks job retreat management tables as shown in FIGS. 12A to 12C stored in the RAM 2031 in the storage 2030 of the printer in order to discriminate the presence or absence of a retreated job (step 1507). Since no information exists in the job retreat management tables at this time point, it is determined that the automatically retreated job does not exist.

The controller 2010 of the printer subsequently checks the job execution management tables as shown in FIGS. 11A to 11F stored in the RAM 2031 in the storage 2030 of the printer in order to discriminate the presence or absence of a print-waiting job (step 1508). Since the information of the print data "TEST-1" has been inputted at this time point in step 1503, it is determined that the print-waiting job exists.

It is assumed that the processing in steps 1401 to 1404 was executed in the hosts A and B after that and the printing was performed in the following order: namely, print data "SAMPLE-B" (attributes in which an auto retreat flag is turned "ON", a paper size is set to "B4", a stapling is set to "NO", a printing mode is set to "single-sided printing", and the like) from the host B; print data "TEST-2" (attributes in which the auto retreat flag is turned "ON", the paper size is set to "A4", the stapling is set to "NO", the printing mode is set to "single-sided printing", and the like) from the host A; and print data "SAMPLE-C" (attributes in which the auto retreat flag is turned "ON", the paper size is set to "A3", the stapling is set to "YES", the printing mode is set to "single-sided printing", and the like) from the host B. Thus, the total four print data is held as execution jobs in the printer in FIG. 5 and it is assumed that the status in the printer is as shown in FIG. 9 and the job execution management table is as shown in a state of FIG. 11A.

Subsequently, the controller 2010 of the printer analyzes the print attributes of the head print data in the job execution management data stored in the RAM 2031 in the storage 2030 of the printer in order to start the processing of the print-waiting job (step 1601). Specifically speaking, the print attributes of the print data "TEST-1" are obtained.

Subsequently, the controller 2010 of the printer analyzes the status of the printer (step 1602). Specifically speaking, the size of paper set at present is checked, whether the papers of such a size exist or not is discriminated, and whether the other expendable supplies are absent or not are discriminated.

Subsequently, the controller 2010 of the printer discriminates whether the print data "TEST-1" can be normally printed or not (an error occurs or not) by collating the results in steps 1601 and 1602 (step 1603). In this case, since the print data "TEST-1" designates the paper size A4 of the papers which are set at present and the other print attributes are also proper, the controller 2010 of the printer determines that the print data "TEST-1" can be normally printed (no error occurs).

Subsequently, the controller 2010 of the printer executes a part of the print processing of the print data "TEST-1" stored in the RAM 2031 in the storage 2030 of the printer (step 1605).

Subsequently, the controller 2010 of the printer discriminates whether the whole print processing of the print data which is at present being executed has been completed or not (step 1606). In this case, since the print data which is not processed yet exists, the controller 2010 of the printer determines that the whole print processing is not completed yet.

Subsequently, the controller 2010 of the printer updates the information of the job execution management table stored in the RAM 2031 in the storage 2030 of the printer (step 1608). Specifically speaking, the information indicative of an amount of processing which was executed, the status, and the like are updated. The processing routine is returned to step 1501.

Figure 16:
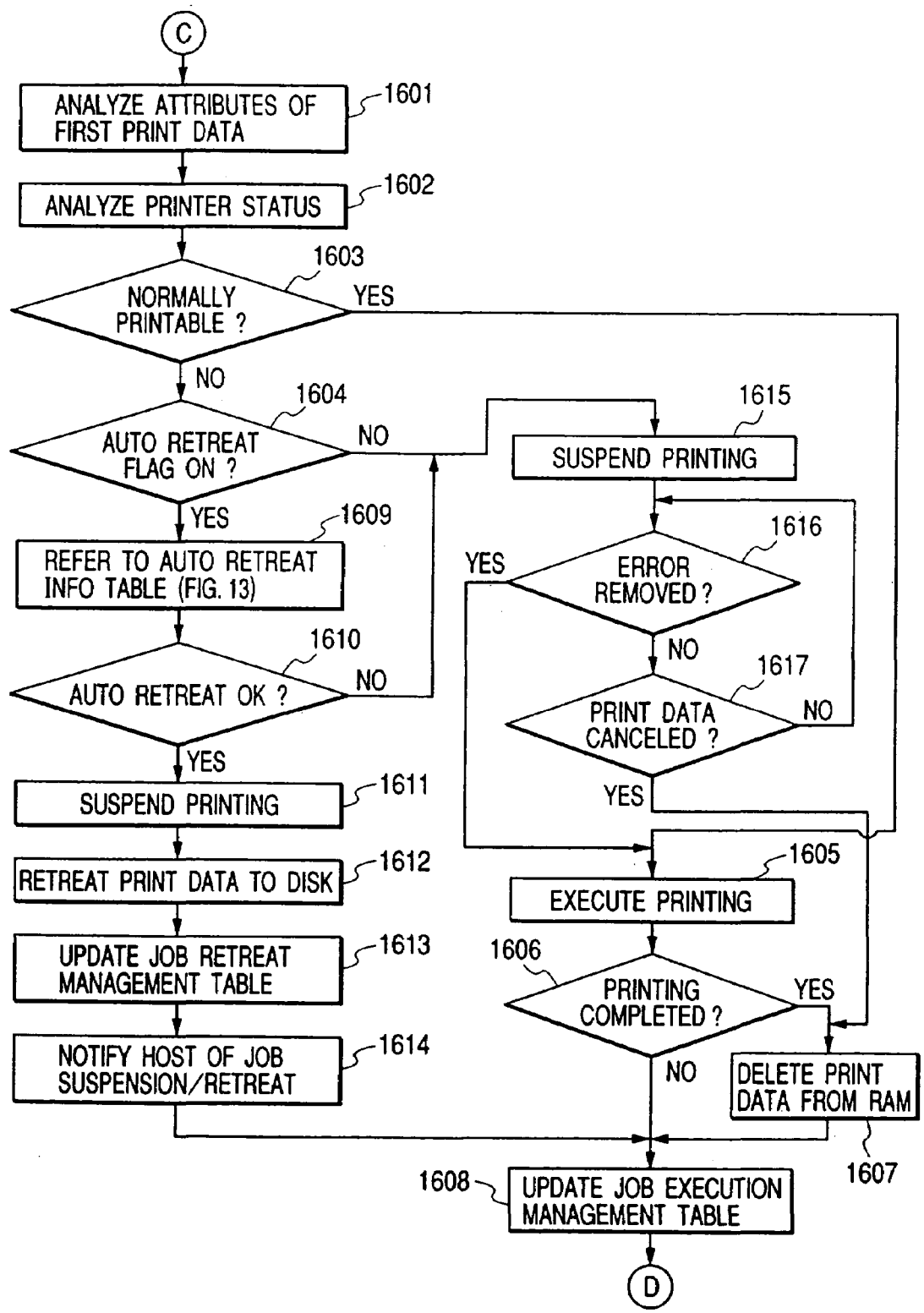
FIG. 16 is a flowchart showing a flow of the control in the invention.
Figure 17:
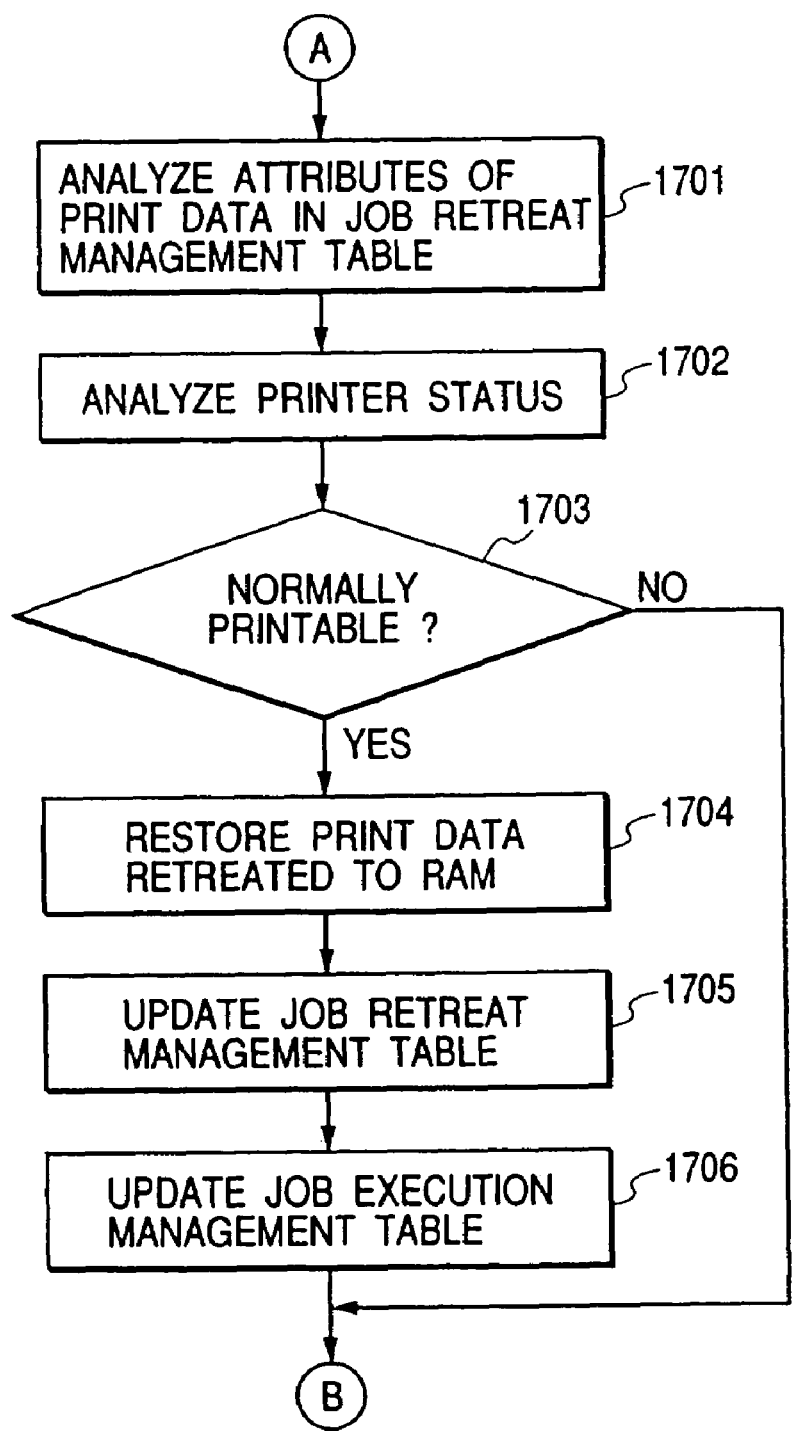
FIG. 17 is a flowchart showing a flow of the control in the invention.
Figure 18:
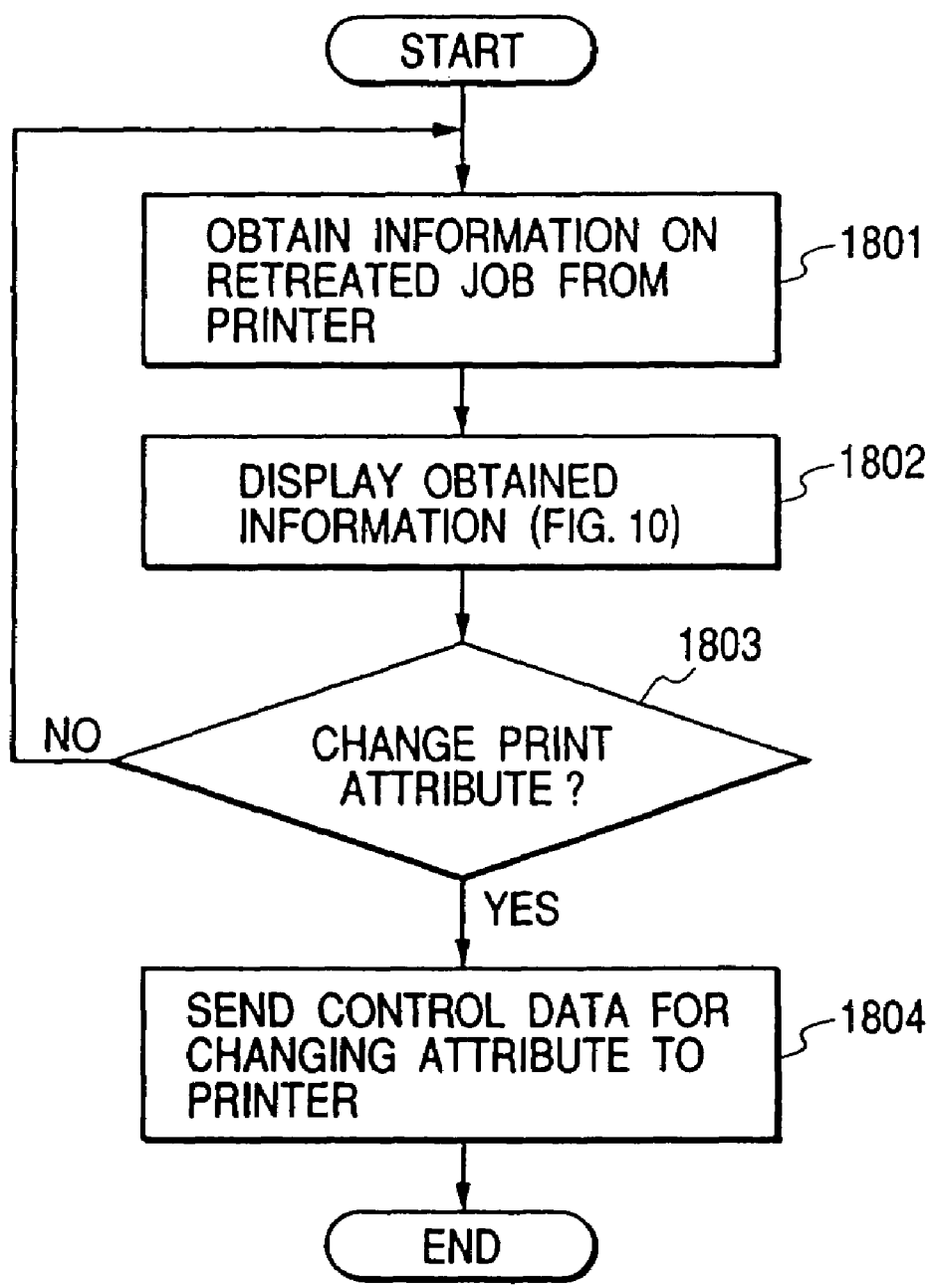
FIG. 18 is a flowchart showing a flow of the control in the invention.

After that, the processing in steps 1501 to 1508 and the processing in steps 1601 to 1608 shown in FIG. 16 are repeated and the controller 2010 of the printer determines that the whole print processing has been completed (step 1606).

Subsequently, the controller 2010 of the printer deletes the print data whose processing has been finished from the RAM 2031 in the storage 2030 of the printer (step 1607). The controller 2010 updates (deletes) the information of the job (print data "TEST-1") of No. 1 in the job execution management table (A) as shown in FIG. 11A, so that the job execution management data changes as shown in FIG. 11B. The processing routine is returned to step 1501.

In order to start the processing of the print-waiting job, the controller 2010 of the printer analyzes the print attributes of the head print data in the job execution management table stored in the RAM 2031 in the storage 2030 of the printer (step 1601). Specifically speaking, the print attributes of the print data "SAMPLE-B" is obtained.

Subsequently, the controller 2010 of the printer analyzes the status of the printer (step 1602). Specifically speaking, the size of paper set at present is checked, whether the papers of such a size exist or not is discriminated, and whether the other expendable supplies are absent or not are discriminated.

Subsequently, the controller 2010 of the printer discriminates whether the print data "SAMPLE-B" can be normally printed or not (an error occurs or not) by collating the results in steps 1601 and 1602 (step 1603). In this case, since the print data "SAMPLE-B" designates the paper size B5 of the papers which are not set at present, the controller 2010 of the printer determines that the print data "SAMPLE-B" cannot be normally printed (an error occurs).

Subsequently, the controller 2010 of the printer checks the print data "SAMPLE-B" stored in the RAM 2031 in the storage 2030 of the printer to see if the auto retreat flag has been set (step 1604).

If the auto retreat flag is not set in the print data "SAMPLE-B", an operation similar to that in the conventional apparatus is executed. The whole processing is temporarily suspended, the print processing is resumed at a point when the user supplements the expendable supplies, and an output can be soon obtained. Specifically speaking, the controller 2010 of the printer suspends the print processing (step 1615).

The controller subsequently discriminates whether the cause of the error has been removed or not (step 1616). When the user supplements the expendable supplies, step 1605 follows and the print processing is completed.

When it is determined that the cause of the error is not removed, the controller 2010 of the printer discriminates whether the cancel of the print data has been instructed or not (step 1617). When the controller 2010 of the printer determined that the cancel of the print data has been instructed, step 1607 follows. When the controller 2010 of the printer determined that the cancel of the print data is not instructed, the processing routine is returned to step 1616 and the suspending status is allowed to continue.

In this case, since the auto retreat flag has been set in the print data "SAMPLE-B", an auto retreat information table as shown in FIG. 13 stored in the RAM in the storage 2030 of the printer is referred to (step 1609).

Subsequently, the controller 2010 of the printer analyzes the contents of the error which occurs at present and the auto retreat information table and discriminates whether the print data can be automatically retreated or not (step 1610). In this case, since the cause of the error relates to "no paper" (the papers of the relevant paper size do not exist) in the auto retreat information table, it is decided that the print data can be retreated. If the cause of the error does not exist in the auto retreat information table, step 1615 follows and processing is executed in a manner similar to the conventional technique.

Subsequently, the controller 2010 of the printer suspends the print processing of the print data "SAMPLE-B" (step 1611).

Subsequently, the controller 2010 of the printer stores the print data "SAMPLE-B" as a retreated job into the disk 2033 in the storage 2030 of the printer and the status in the printer becomes as shown in FIG. 9 (step 1612).

Subsequently, the controller 2010 of the printer updates the information in the job retreat management table stored in the RAM 2031 in the storage 2030 of the printer (step 1613). Specifically speaking, the information of the print data "SAMPLE-B" is inputted and the job retreat management table changes as shown in FIG. 12A.

Subsequently, the controller 2010 of the printer notifies the host of the fact that the print processing of the job has been suspended and the print data has been retreated (step 1614). Specifically speaking, the cause of the suspension and the information indicating that the print data has been retreated are sent to the controller 1010 of the host B via the connector 2020 of the printer and the connector 1020 of the host B as an owner.

A flow of processing (refer to FIG. 14) of the host A in FIG. 5 will now be described.

Figure 8:
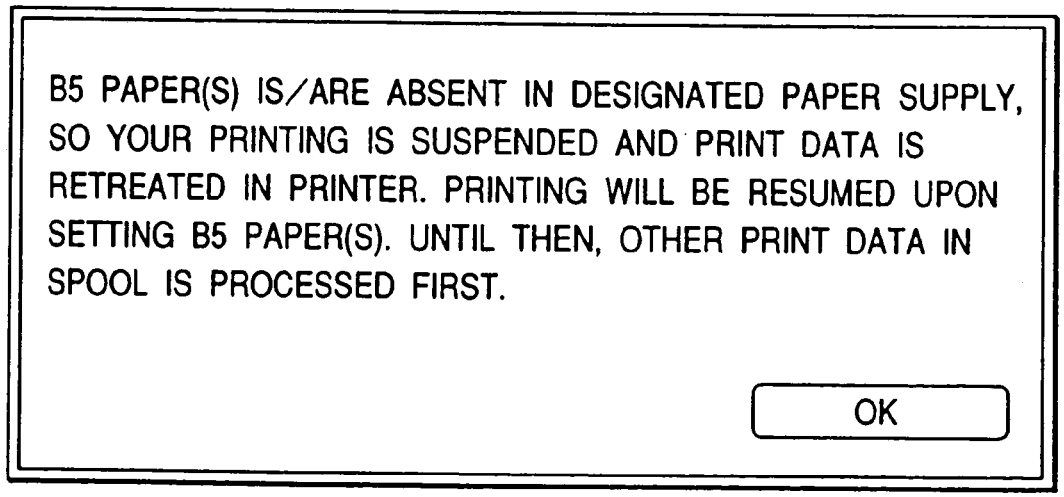
FIG. 8 is a conceptual diagram for explaining the print method in the embodiment of the invention.

The controller 1010 discriminates whether some notice has been received from the printer or not (step 1405). At this time point, it is decided that the notice has been received from the printer, and the controller 1010 analyzes the contents of the notice and displays them to a display 1040 of the host (step 1406). Specifically speaking, for example, a dialog as shown in FIG. 8 is displayed. At least the reasons of the retreat and a method of cancelling the retreat are described in the dialog.

A flow of processing (refer to FIG. 16) of the printer in FIG. 5 will now be described.

The controller 2010 of the printer updates the information in the job execution management table held in the RAM 2031 in the storage 2030 of the printer (step 1608). Specifically speaking, the information of the print data "SAMPLE-B" whose print processing was suspended is deleted and the job execution management data changes as shown in FIG. 11C. The processing routine is returned to step 1501.

In this instance, although an error occurred in the print job "SAMPLE-B" and the processing was suspended, by automatically retreating the print data, the printer can be set into a status where the processing of the next print data can be started. That is, even if the error occurred in the print data "SAMPLE-B", an influence that is exerted on the next print-waiting print job "TEST-2" (in other words, the processing of this job is made to wait) can be avoided.

Subsequently, the controller 2010 of the printer executes the processing in steps 1501 to 1507. Since the information of the print data "SAMPLE-B" has been inputted into the job retreat management data at this time point as shown in FIG. 12A, the controller 2010 of the printer determines the presence of the retreated job in step 1507.

Subsequently, the controller 2010 of the printer obtains the print attributes of the print data in the job retreat management table in the RAM 2031 in the storage 2030 of the printer (step 1701) in order to confirm whether the processing of the retreated job can be resumed or not.

Subsequently, the controller 2010 of the printer analyzes the printer status (step 1702). Specifically speaking, the size of paper set at present is checked, whether the papers of such a size exist or not is discriminated, and whether the other expendable supplies are absent or not are discriminated.

Subsequently, the controller 2016 of the printer discriminates whether the print data "SAMPLE-B" can be normally printed or not (whether the print processing can be resumed or not) by collating the results in steps 1701 and 1702 (step 1703). In this case, since the papers of the paper size B5 which are necessary to print the print data "SAMPLE-B" are not set, the controller 2010 of the printer determines that the print data "SAMPLE-B" cannot be normally printed (the print processing cannot be resumed). The processing routine advances to step 1508.

Subsequently, the controller 2010 of the printer checks the job execution management table as shown in FIGS. 11A to 11F stored in the RAM 2031 in the storage 2030 of the printer to see if the print-waiting job exists (step 1508). Since the information of the print data "TEST-2" and "SAMPLE-C" has been inputted at this time point, the print-waiting job is determined to be present.

Subsequently, the controller 2010 of the printer analyzes the print attributes of the head print data in the job execution management table stored in the RAM 2031 in the storage 2030 of the printer in order to start the processing of the print-waiting job (step 1601). Specifically speaking, the print attributes of the print data "TEST-2" are obtained. Since the print attributes of the print data "TEST-2" indicate that no error occurs, the processing in steps 1501 to 1508, the processing in steps 1601 to 1608, and the processing in 1701 to 1703 are repeated, so that the whole print processing is completed.

The controller 2010 of the printer updates the information in the job execution management table stored in the RAM 2031 in the storage 2030 of the printer (step 1608). Specifically speaking, the information of the print data "TEST-2" whose print processing has been completed is deleted and the job execution management table changes as shown in FIG. 11D. The processing routine is returned to step 1501.

Subsequently, the controller 2010 of the printer analyzes the print attributes of the head print data in the job execution management table stored in the RAM 2031 in the storage 2030 of the printer in order to start the processing of the print-waiting job (step 1601). Specifically speaking, the print attributes of the print data "SAMPLE-C" are obtained. Since the print attributes of the print data "SAMPLE-C" indicate "stapling", the controller 2010 of the printer determines that the print data cannot be normally printed (an error occurs) in step 1603.

Subsequently, the controller 2010 of the printer checks the print data "SAMPLE-C" stored in the RAM 2031 in the storage 2030 of the printer in order to discriminate whether the auto retreat flag has been set to ON or not (step 1604).

In this case, since the auto retreat flag has been set in the print data "SAMPLE-C", the auto retreat information table stored in the RAM 2031 in the storage 2030 of the printer is referred to (step 1609).

Subsequently, the controller 2010 of the printer analyzes the contents of the error occurring at present and the auto retreat information table and discriminates whether the print data can be automatically retreated or not (step 1610). In this case, since the cause of the error relates to "no staple" (staples which are used to staple do not exist) in the auto retreat information table, it is decided that the print data can be retreated.

Subsequently, the controller 2010 of the printer suspends the print processing of the print data "SAMPLE-C" (step 1611).

Subsequently, the controller 2010 of the printer stores the print data "SAMPLE-C" into the disk in the storage 2030 of the printer (step 1612).

Subsequently, the controller 2010 of the printer updates the information in the job retreat management table stored in the RAM 2031 in the storage 2030 of the printer (step 1613). Specifically speaking, the information of the print data "SAMPLE-C" is inputted and the job retreat management table changes as shown in FIG. 12B.

Subsequently, the controller 2010 of the printer notifies the host of the fact that the print processing of the job has been suspended and the print data has been retreated (step 1614). Specifically speaking, the cause of the suspension and the information indicating that the print data has been retreated are sent to the controller 1010 via the connector 2020 of the printer and the connector 1020 of the host B as an owner. The information is displayed on the display 1040 in the host B.

The controller 2010 of the printer updates the information in the job execution management table held in the RAM 2031 in the storage 2030 of the printer (step 1608). Specifically speaking, since the information of the print data "SAMPLE-C" whose print processing was suspended is deleted, the contents of the information in the job execution management table are deleted. The processing routine is returned to step 1501.

Initially, four print-waiting print data exists in order of "TEST-1", "SAMPLE-B", "TEST-2", and "SAMPLE-C". However, at this time point, the printing of the print data "TEST-1" and "TEST-2" in which no error occurs has been completed and the print data "SAMPLE-B" and "SAMPLE-C" in which there is no expendable supplies and the error occurred has been retreated and held in the printer.

It is assumed that the user has set the papers of the B5 size into the printer in this status. The controller 2010 of the printer executes the processing in steps 1501 to 1507. At this time point, since the information of the print data "SAMPLE-B" and "SAMPLE-C" has been inputted in the job retreat management table as shown in FIG. 12B, the controller 2010 of the printer determines that the retreated job exists in step 1507.

Subsequently, the controller 2010 of the printer analyzes the print attributes in the job retreat management table stored in the RAM 2031 in the storage 2030 of the printer in order to confirm whether the processing of the retreated job can be resumed or not (step 1701). Specifically speaking, the print attributes of the print data "SAMPLE-B" and "SAMPLE-C" are obtained.

Subsequently, the controller 2010 of the printer analyzes the printer status (step 1702). Specifically speaking, the size of paper set at present is checked, whether the papers of such a size exist or not is discriminated, and whether the other expendable supplies are absent or not are discriminated.

Subsequently, the controller 2010 of the printer discriminates whether the print data "SAMPLE-B" and "SAMPLE-C" can be normally printed or not (whether the print processing can be resumed or not) by collating the results in steps 1701 and 1702 (step 1703). In this case, since the papers of the paper size B5 necessary for printing have been set only for the print data "SAMPLE-B", the controller 2010 of the printer determines that the print data can be normally printed (print processing can be resumed).

Subsequently, the controller 2010 of the printer restores (copies) the print data "SAMPLE-B" stored in a memory device in the storage 2030 of the printer into the RAM 2031 in the storage 2030 of the printer. The controller 2010 of the printer deletes the print data "SAMPLE-B" stored in the memory device in the storage 2030 of the printer (step 1704).

Subsequently, the controller 2010 of the printer updates the information in the job retreat management table stored in the RAM 2031 in the storage 2030 of the printer (step 1705). Specifically speaking, the information of the print data "SAMPLE-B" is deleted, so that the job retreat management table changes as shown in FIG. 12C.

Subsequently, the controller 2010 of the printer updates the information in the job execution management table stored in the RAM 2031 in the storage 2030 of the printer (step 1706). Specifically speaking, the information of the print data "SAMPLE-B" whose print processing was resumed is inputted and the job execution management table changes as shown in FIG. 11E. The processing routine advances to step 1508.

After that, the controller 2010 of the printer repeats the processing in steps 1501 to 1508 and the processing in steps 1601 to 1608 and outputs the print data "SAMPLE-B". The controller 2010 of the printer determines that the whole print processing has been completed in step 1606.

It is assumed that the user has set the staples into the printer in this status. The controller 2010 of the printer executes the processing in steps 1501 to 1507. At this time point, since the information of the print data "SAMPLE-C" has been inputted into the job retreat management table as shown in FIG. 12C, the controller 2010 of the printer decides that the retreated job exist in step 1507.

Subsequently, the controller 2010 of the printer analyzes the print attributes of the print data in the job retreat management table held in the RAM 2031 in. The storage 2030 of the printer in order to confirm whether the processing of the retreated job can be resumed or not (step 1701). Specifically speaking, the print attributes of the print data "SAMPLE-C" are obtained.

Subsequently, the controller 2010 of the printer analyzes the printer status (step 1702). Specifically speaking, the size of paper set at present is checked, whether the papers of such a size exist or not is discriminated, and whether the other expendable supplies are absent or not are discriminated.

Subsequently, the controller 2010 of the printer discriminates whether the print data "SAMPLE-C" can be normally printed or not (whether the print processing can be resumed or not) by collating the results in steps 1701 and 1702 (step 1703). In this case, since the staples necessary for printing the print data "SAMPLE-C" have been set, the controller 2010 of the printer determines that the print data can be normally printed (print processing can be resumed).

Subsequently, the controller 2010 of the printer restores (copies) the print data "SAMPLE-C" stored in the memory device in the storage 2030 of the printer into the RAM 2031 in the storage 2030 of the printer. The controller 2010 of the printer deletes the print data "SAMPLE-C" stored in the memory device in the storage 2030 of the printer (step 1704).

Subsequently, the controller 2010 of the printer updates the information in the job retreat management table stored in the RAM 2031 in the storage 2030 of the printer (step 1705). Specifically speaking, since the information of the print data "SAMPLE-C" is deleted, the contents of the information in the job retreat management table are fully deleted.

Subsequently, the controller 2010 of the printer updates the information in the job execution management table stored in the RAM 2031 in the storage 2030 of the printer (step 1706). Specifically speaking, the information of the print data "SAMPLE-C" whose print processing was resumed is inputted and the job execution management table changes as shown in FIG. 11F. The processing routine advances to step 1508.

After that, the controller 2010 of the printer repeats the processing in steps 1501 to 1508 and the processing in steps 1601 to 1608 and outputs the print data "SAMPLE-C". The controller 2010 of the printer determines that the whole print processing has been completed in step 1606.

A message indicating that all of the printable jobs have already been completed (deleted) in the printer status at that time point can be notified to the host as an owner of the retreated job and displayed before the retreated job is executed.

(Embodiment 2)

As an embodiment 2, it is possible to improve a method of taking a countermeasure against the resume of the printing of the retreated print data.

In the embodiment 1, the user actually supplements the expendable supplies, thereby allowing the print attributes to be satisfied and allowing the print processing of the retreated print data to be automatically resumed.

According to the embodiment 2, a utility for changing the print attributes of the print data which was retreated and held in the printer from the host by a remote operation is provided. By this utility, the print attributes in which an error occurs are changed so as to be adapted to the present printer status, thereby allowing the print processing to be resumed. Specifically speaking, the utility having a user interface as shown in FIG. 10 is provided and processing in steps 1801 to 1804 is executed.

It is now assumed that the print job "SAMPLE-C" has been retreated as shown in the job retreat management table in FIG. 12C.

The controller 1010 of the host obtains the information of the retreated job in the printer with reference to the job retreat management table of the printer (step 1801).

Subsequently, the controller 1010 of the host displays the information of the retreated job in the printer onto the display 1040 in a form as shown in FIG. 10 on the basis of the information obtained from the printer (step 1802).

Subsequently, the controller 1010 of the host discriminates whether the user has instructed to change the print attributes of an arbitrary job by an input unit 1070 of the host or not (step 1803).

For example, it is assumed that the user changed the item "stapling" in FIG. 10 from "YES" to "NO". In this case, the controller 1010 of the host determines that the user instructed to change the print attributes of the job, so that it sends control data for changing the print attributes to the printer (step 1804). Thus, no error occurs in the print data "SAMPLE-C" and the print processing is restarted.

By the above operation, the print processing of the print data which was retreated and held can be easily resumed from a remote place. Even if the various component elements described as examples in the foregoing embodiments are replaced with the following component elements, they will be valid.

Printer . . . Plotter, copying apparatus, facsimile, etc.

Host . . . Personal computer, workstation, minicomputer, etc.

Controller . . . Software, ROM, RAM, etc.
Connector . . . Serial interface board, parallel interface board, network interface board, etc.
Storage . . . Memory, magnetic disk device, magnetooptic disk device, magnetic tape device, etc.
Printer . . . Laser beam system, bubble jet system, LED system, thermal transfer system, etc.
Display . . . CRT, LCD, etc.
Input unit . . . Keyboard, mouse, track ball, etc.
Memory medium reader . . . FD device, MO device, CD-ROM device, IC memory card device, etc.
Recording medium . . . FD, MO, CD-ROM, IC memory card, etc.

As described above, according to the printing method and medium of the invention, there is such an effect that when an error occurs due to the cause of absence of the expendable supplies, by automatically retreating and holding the print data, the deterioration of the working efficiency of the print-waiting print data (the other users) can be avoided. There is also such an effect that the resources of the shared memory device and the like of the printer are utilized and the working efficiency is improved.

There are such effects that the print processing of the print data which was retreated and held can be easily resumed from a remote place and a using efficiency is improved.

What is claimed is:

1. A printer that communicates with a host computer, comprising:
   a control unit adapted to, if first print data received from the host computer cannot be output by the printer, and if it is possible to output second print data subsequently received after the first print data is received from the host computer, retreating the first print data and outputting the second print data,
   wherein when the first print data cannot be output and when it is possible to output the second print data, said control unit retreats the first print data based on an indication whether or not the print data is to be retreated, the indication being included in each print instruction provided by the host computer.

2. The printer according to claim 1, further comprising:
   a job execution management unit adapted to manage at least one print data such that an output process is executed sequentially from the first listed print data; and
   a job retreat management unit adapted to manage at least one print job retreated by said control unit,
   wherein if the first print data cannot be output by the printer and if the first print data is to be retreated, said control unit cancels registration of the first print data in said job execution management unit and registers the first print data in said job retreat management unit, and when it becomes possible to output the retreated first print data, said control unit cancels registration of the first print data in said job retreat management unit and registers the first print data again in said job execution management unit.

3. The printer according to claim 1, further comprising a notification unit adapted to notify the host computer of list information representing the at least one print data registered in said job retreat management unit with a distinguishable indication that each of the at least one print data is retreated.

4. The printer according to claim 3, further comprising a setting change control unit that receives, from the host computer, an instruction for changing a setting on any of the at least one print data represented by the list information notified by said notification unit, and executing the setting change on the print data instructed by the received instruction.

5. The printer according to claim 4, wherein, when it becomes possible to output one of the at least one retreated print data due to the setting change by said setting change control unit, said control unit cancels registration of the one print data in said job retreat management unit and registers the one print data again in said job execution management unit.

6. The printer according to claim 1, further comprising a reception unit adapted to receive the indication whether the print data is to be retreated, from the host computer.

7. The printer according to claim 6, wherein the indication indicates for each of a plurality of items whether the print data is to be retreated, and wherein the host computer designates for each of the plurality of items whether the print data is to be retreated.

8. A print control method for printer that communicates with a host computer, said method comprising the steps of:
   a control step of controlling, if first print data received from the host computer cannot be output by the printer, and if it is possible to output second print data subsequently received after the first print data is received from the host computer, retreating the first print data and outputting the second print data,
   wherein when the first print data cannot be output and when it is possible to output the second print data, said control step retreats the first print data based on an indication whether or not the print data is to be retreated, the indication being included in each print instruction provided by the host computer.

9. The method according to claim 8, further comprising the steps of:
   a job execution management step of managing at least one print data such that an output process is executed sequentially from the first listed print data; and
   a job retreat management step of managing at least one print job retreated by said control step,
   wherein if the first print data cannot be output and if the first print data is to be retreated, said control step cancels registration of the first print data in said job execution management step and registers the first print data in said job retreat management step, and when it becomes possible to output the retreated first print data, said control step cancels registration of the first print data in said job retreat management step and registers the first print data again in said job execution management step.

10. The method according to claim 8, further comprising a notification step of notifying the host computer of list information representing the at least one print data registered in said job retreat management step with a distinguishable indication that each of the at least one print data is retreated.

11. The method according to claim 10, further comprising a setting change control step of receiving, from the host computer, an instruction for changing a setting on any of the at least one print data represented by the list information notified by said notification step, and executing the setting change on the print data instructed by the received instruction.

12. The method according to claim 11, wherein, when it becomes possible to output one of the at least one retreated print data due to the setting change by said setting change control step, said control step cancels registration of the one print data in said job retreat management step and registers the one print data again in said job execution management step.

13. The method according to claim 8, further comprising a reception step of receiving the indication whether the print data is to be retreated, from the host computer.

14. The printer according to claim 13, wherein the indication indicates for each of a plurality of items whether the print data is to be retreated, and wherein the host computer designates for each of the plurality of items whether the print data is to be retreated.

* * * * *

UNITED STATES PATENT AND TRADEMARK OFFICE
CERTIFICATE OF CORRECTION

| | |
|---|---|
| PATENT NO. | : 7,212,305 B2 |
| APPLICATION NO. | : 10/973267 |
| DATED | : May 1, 2007 |
| INVENTOR(S) | : Noda |

It is certified that error appears in the above-identified patent and that said Letters Patent is hereby corrected as shown below:

TITLE PAGE:
(62) Related U.S. Application Data, "May 3, 2000," should read -- May 30, 2000, --; and
(57) ABSTRACT, line 18, "apparatus, when" should read -- apparatus. When --.

COLUMN 1:
Line 7, "No. 6,879," should read -- No. 6,897, --.

COLUMN 3:
Line 57, "an" should read -- a --.

COLUMN 5:
Line 17, "an" should read -- a --.

COLUMN 7:
Line 22, "is" should read -- are --;
Line 57, "determined" should read -- determines --; and
Line 59, "determined" should read -- determines--.

COLUMN 9:
Line 8, "controller 2016" should read -- controller 2010 --.

COLUMN 10:
Line 33, "exists" should read -- exist --; and
Line 38, "is" should read -- are --.

COLUMN 11:
Line 35, "exist" should read -- exists --.

COLUMN 13:
Line 4, "magnetooptic" should read -- magneto-optic --.

UNITED STATES PATENT AND TRADEMARK OFFICE
CERTIFICATE OF CORRECTION

PATENT NO.       : 7,212,305 B2
APPLICATION NO.  : 10/973267
DATED            : May 1, 2007
INVENTOR(S)      : Noda It is certified that error appears in the above-identified patent and that said Letters Patent is hereby corrected as shown below:

COLUMN 14:
Line 21, "for printer" should read -- for a printer --.

Signed and Sealed this

Twentieth Day of May, 2008

JON W. DUDAS
*Director of the United States Patent and Trademark Office*